United States Patent [19]

Coran et al.

[11] 4,130,535

[45] Dec. 19, 1978

[54] THERMOPLASTIC VULCANIZATES OF OLEFIN RUBBER AND POLYOLEFIN RESIN

[75] Inventors: Aubert Y. Coran; Balbhadra Das; Raman P. Patel, all of Akron, Ohio

[73] Assignee: Monsanto Company, St. Louis, Mo.

[21] Appl. No.: 679,812

[22] Filed: Apr. 30, 1976

Related U.S. Application Data

[63] Continuation-in-part of Ser. No. 597,639, Jul. 21, 1975, abandoned.

[51] Int. Cl.² ............... C08L 23/16; C08L 23/32
[52] U.S. Cl. ............... 260/33.6 AQ; 260/42.33; 260/897 A
[58] Field of Search ............ 260/889, 897 A, 33.6 AQ

[56] References Cited

U.S. PATENT DOCUMENTS

| 3,256,366 | 6/1966 | Corbelli et al. | 260/897 A |
|---|---|---|---|
| 3,489,710 | 1/1970 | Bonotto et al. | 260/889 |
| 3,564,080 | 2/1971 | Pedretti et al. | 260/897 A |
| 3,758,643 | 9/1973 | Fisher | 260/897 A |
| 3,806,558 | 4/1974 | Fisher | 260/897 A |
| 3,862,106 | 1/1975 | Fisher | 260/897 A |
| 3,904,470 | 9/1975 | Fukuki et al. | 260/897 A |
| 3,957,919 | 5/1976 | Von Bodungen et al. | 260/897 A |
| 4,059,651 | 11/1977 | Smith | 260/897 A |

*Primary Examiner*—John C. Bleutge
*Attorney, Agent, or Firm*—L. R. Swaney

[57] ABSTRACT

Thermoplastic vulcanizates, comprising blends of olefin rubber and thermoplastic olefin resin in which the rubber is completely cured, exhibit superior physical properties including improved tensile strength.

52 Claims, No Drawings

4,130,535

THERMOPLASTIC VULCANIZATES OF OLEFIN RUBBER AND POLYOLEFIN RESIN

This application is a continuation-in-part application of application Ser. No. 597,639 filed July 21, 1975 now abandoned. This invention relates to thermoplastic compositions and, more particularly, to thermoplastic compositions comprising blends of polyolefin resin and completely cured monoolefin copolymer rubber, and especially to elastomeric thermoplastic compositions.

BACKGROUND OF THE INVENTION

Thermoplastics are compositions which can be molded or otherwise shaped and reprocessed at temperatures above their melting or softening point. Thermoplastic elastomers are materials which exhibit both thermoplastic and elastomeric properties, i.e., the materials process as thermoplastics but have physical properties like elastomers. Shaped articles may be formed from thermoplastic elastomers by extrusion, injection molding or compression molding without the time-consuming cure step required with conventional vulcanizates. Elimination of the time required to effect vulcanization provides significant manufacturing advantages. Further, thermoplastic elastomers can be reprocessed without the need for reclaiming and, in addition, many thermoplastics can be thermally welded.

Block copolymers containing alternating "hard" and "soft" segments within the copolymer chain comprise one well known class of thermoplastic elastomers. Other classes of thermoplastic elastomers derived from inexpensive and readily available raw materials comprise thermoplastic blends of partially cured monoolefin copolymer rubber and polyolefin resin and dynamically partially cured blends of monoolefin copolymer rubber and polyolefin resin, W.K. Fischer, U.S. Pat. Nos. 3,758,643 and 3,806,558. Products are obtained which process as thermoplastics provided that conditions are controlled so as to obtain only a partial cure. Although the partial cure may increase the strength of the product, the tensile strengths are still so low as to limit potential applications for these materials. The present invention provides vulcanizates having greatly increased strength but which are nevertheless thermoplastic.

SUMMARY OF THE INVENTION

There have now been discovered compositions comprising blends of polyolefin resin and monoolefin copolymer rubber characterized by the rubber being fully cured but the blends nevertheless being processable as thermoplastics and having improved physical properties as compared to uncured or partially cured blends heretofore known. Such blends in which the rubber is cured are herein referred to as vulcanizates. It was found that if the proportion of resin in the blend is above certain critical limits which vary somewhat with the particular resin, rubber and compounding ingredients selected, the fully cured compositions are still thermoplastic. The blends from which the thermoplastic vulcanizates of the invention are prepared comprise about 25-95 percent by weight of the resin and about 75-5 percent by weight of the rubber. According to certain preferred aspects of the invention, the proportion of the rubber is sufficiently high that the thermoplastic vulcanizates are elastomers.

The thermoplastic elastomers in accordance with this invention are fully cured vulcanizates of compositions comprising blends of (a) 25-75 percent by weight of thermoplastic polyolefin resin and (b) about 75-25 percent by weight of monoolefin copolymer rubber. A preferred elastomer comprises the vulcanizate of a blend of 30-70 percent by weight of the resin and 70-30 percent by weight of the rubber. Such fully cured vulcanizates are processable as thermoplastics although they are cross-linked to a point where the rubber portions are almost entirely insoluble in the usual solvents. Other ingredients may be present. Indeed, it is a feature of the invention that oil extended vulcanizates can be prepared having the improved strengths herein described. For the preparation of oil extended vulcanizates, a ratio of about 35 to 65 percent of the resin and about 65 to 35 percent of the rubber is desirable. Whether oil extended or not, the fully cured products are processable as thermoplastics.

The procedure appropriate for evaluating state of cure will depend upon the particular ingredients present in the blends. In this connection, essentially complete gelation of, say, 96% or more is not always a necessary criterion of a fully cured product because of differences in molecular weight, molecular weight distribution and other variables among monoolefin copolymer rubbers which influence the gel determination independently of cross-link density. Determination of the cross-link density of the rubber is an alternative means of determining state of cure of the vulcanizates but must be determined indirectly because the presence of the resin interferes with the determination. Accordingly, the same rubber as present in the blend is treated under conditions with respect to time, temperature, and amount of curative which result in a fully cured product as demonstrated by its cross-link density, and such cross-link density is assigned to the blend similarly treated. In general, a cross-link density of about $7 \times 10^{-5}$ or more moles (number of cross-links divided by Avogadro's number) per milliliter of rubber is representative of the values reported for fully cured monoolefin copolymer rubber. The outstanding effect of fully curing the composition is the very substantial improvement in tensile strength and this serves as a convenient measure of a fully cured product which directly relates to its practical uses. In particular, the elastomeric vulcanizates of the invention are fully cured as represented by a tensile strength of about 60 Kg/sq. cm. and preferably 100 Kg/sq. cm. greater than that of the unvulcanized blend. Surprisingly, such high strength elastomeric vulcanizates are still thermoplastic as contrasted to thermoset elastomers.

Vulcanizable rubbers, although thermoplastic in the unvulcanized state, are normally classified as thermosets because they undergo the irreversible process of thermosetting to an unprocessable state. The products of the instant invention, although processable, are vulcanizates because they can be prepared from blends of rubber and resin which are treated with curatives in amounts and under time and temperature conditions known to give fully cured products from static cures of the rubber in molds and, indeed, the rubber has undergone gelation to the extent characteristic of such state of cure. The thermoset state can be avoided in the compositions of the invention by simultaneously masticating and curing the blends. Thus, the thermoplastic vulcanizates of the invention may be prepared by blending a mixture of olefin copolymer rubber, polyolefin resin, and curatives, then masticating the blend at vulcanization temperature until vulcanization is complete, using conventional masticating equipment, for example, Banbury mixer, Brabender mixer, or certain mixing extruders The ingredients except curative are mixed at a temperature sufficient to soften the polyolefin resin or, more commonly, at a temperature above its melting point if the resin is crystalline at ordinary temperatures. After the resin and rubber are intimately mixed, curative is added. Heating and masticating at vulcanization temperatures are generally adequate to complete the vulcanization reaction in a few minutes or less, but if shorter vulcanization times are desired, higher temperatures may be used. A suitable range of vulcanization temperatures is from about the melting temperature of the polyolefin resin (about 120° C. in the case of polyethylene and about 175° C. in the case of polypropylene) to 250° C. or more; typically, the range is from about 150° C. to 225° C. A preferred range of vulcanization temperatures is from about 180° to about 200° C. To obtain thermoplastic vulcanizates, it is important that mixing continues without interruption until vulcanization occurs. If appreciable curing is allowed after mixing has stopped, a thermoset unprocessable vulcanizate maybe obtained.

Moreover, the particular results obtained by the aforedescribed dynamic curing process are a function of the particular rubber curing system selected. The curatives and the curative systems conventionally used to vulcanize olefin rubbers are utilizable for preparing the improved thermoplastics of the invention, but it appears to have been heretofore unrecognized that some curatives, particularly certain peroxides, may degrade polyolefin resins during dynamic curing to the extent that the desired results are not obtained. Similarly, although monoolefin copolymer rubbers commercially available are utilizable for preparing the improved thermoplastics, such rubbers having narrow molecular weight distributions provide thermoplastic vulcanizates with improved tensile properties as compared to olefin copolymer rubbers which form networks less efficiently in the vulcanization process. Polydispersity values (weight average molecular weight divided by number average molecular weight) of less than about 3.5 and, more preferably, less than 3.0 or 2.6 are desirable for the monoolefin copolymer rubber. Moreover, the presence of at least about 25% by weight of polyolefin resin in the blend is required for the consistent preparation of processable thermoplastic elastomers. It is thus possible to obtain unprocessable dynamically cured vulcanizates even before complete gelation has occurred or to obtain only minor improvements in tensile strength by vulcanization. But it is assumed that no one would want to achieve a useless result, and would not be mislead by the fact that the interaction of the variables which influence the result is imperfectly understood. A few simple experiments within the skill of the art utilizing available rubbers and curative systems will suffice to determine their applicability for the preparation of the improved products of this invention.

The new products are all processable in an internal mixer, to products which, upon transferring at temperatures above the softening or crystallizing points of the resin phases to the rotating rolls of a rubber mill, form continuous sheets. The sheets are reprocessable in the internal mixer in which, upon reaching temperatures above the softening or melting points of the resin phases, are again transformed to the plastic state (molten state of the resin phase) but upon passing the molten product through the rolls of the rubber mill a continuous sheet again forms. It is in the foregoing sense that "processable" will be herein understood.

Where the determination of extractables is an appropriate measure of the state of cure, the improved thermoplastic vulcanizates are produced by vulcanizing the blends to the extent that the vulcanizate contains no more than about three percent by weight of rubber extractable in cyclohexane at 23° C. and preferably to the extent that the vulcanizate contains less than two percent by weight extractable in cyclohexane at 23° C. In general, the less extractables the better are the properties and still more preferable are vulcanizates having essentially no extractable rubber (less than 0.5 weight percent) in cyclohexane at 23° C. Gel content reported as percent gel is determined by the procedure of U.S. Pat. No. 3,203,937 which comprises determining the amount of insoluble polymer by soaking the specimen for 48 hours in cyclohexane at 23° C. and weighing the dried residue, making suitable corrections based upon knowledge of the composition. Thus, corrected initial and final weights are used by subtracting from the initial weight the weight of the components soluble in cyclohexane, other than the rubber, such as extender oils, plasticizers and components of the resin soluble in cyclohexane. Any insoluble pigments, fillers, etc., are subtracted from both the initial and final weights.

To employ cross-link density as the measure of the state of cure which characterizes the improved thermoplastic vulcanizates, the blends are vulcanized to the extent which corresponds to vulcanizing the same monoolefin copolymer rubber as in the blend statically cured under pressure in a mold with such amounts of the same curative as in the blend and under such conditions of time and temperature to give a cross-link density greater than about $7 \times 10^{-5}$ moles per milliliter of rubber and preferably greater than about $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives with the rubber alone the aforesaid cross-link density that the curative does not react with the resin or that there is no reaction between the resin and rubber. There may be highly significant reactions involved but of limited extent. However, the assumption that the cross-link density determined as described provides a useful approximation of the cross-link density of the thermoplastic vulcanizates is consistent with the thermoplastic properties and with the fact that a large proportion of the resin can be removed from the vulcanizate by high temperature solvent extraction, for example, by boiling decalin extraction.

The cross-link density of the rubber is determined by the Flory-Rehner equation, *J. Rubber Chem. and Tech.*, 30, p. 929. The Huggins solubility parameter for cyclohexane used in the calculation is 0.315, according to Holly, *J. Rubber Chem. and Tech.*, 39, 1455. The cross-link density is half the network chain density $\nu$ determined in the absence of resin. The cross-link density of the vulcanized blends will, therefore, be hereinafter understood to refer to the value determined on the same rubber as in the blend in the manner described. Still more preferred vulcanizates meet both of the aforedescribed measures of state of cure, namely, by estimation of cross-link density and percent of rubber extractable in cyclohexane.

Suitable monoolefin copolymer rubber comprises essentially non-crystalline, rubbery copolymer of two or more alpha monoolefins, preferably copolymerized with at least one polyene, usually a diene. However, saturated monoolefin copolymer rubber, commonly called "EPM" rubber, can be used, for example copolymers of ethylene and propylene. Examples of unsaturated monoolefin copolymer rubber, commonly called "EPDM" rubber, which are satisfactory comprise the products from the polymerization of monomers comprising two monoolefins, generally ethylene and propylene, and a lesser quantity of non-conjugated diene. Suitable alpha monoolefins are illustrated by the formula $CH_2 = CHR$ in which R is hydrogen or alkyl of 1-12 carbon atoms, examples of which include ethylene, propylene, 1-butene, 1-pentene, 1-hexene, 2-methyl-1-propene, 3-methyl-1-pentene, 4-methyl-1-pentene, 3,3-dimethyl-1-butene, 2,4,4-trimethyl-1-pentene, 5-methyl-1-hexene, 1,4-ethyl-1-hexene and others. Satisfactory non-conjugated dienes include straight chain dienes such as 1,4-hexadiene, cyclic dienes such as cyclooctadiene and bridged cyclic dienes such as ethylidenenorborene. Grades of EPM and EPDM rubbers suitable for the practice of the invention are commercially available; Rubber World Blue Book 1975 Edition, Materials and Compounding Ingredients for Rubber, pages 403, 406–410.

Suitable thermoplastic polyolefin resins comprise crystalline, high molecular weight solid products from the polymerization of one or more monoolefins by either high pressure or low pressure processes. Examples of such resins are the isotactic and syndiotactic monoolefin polymer resins, representative members of which are commercially available. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. Commercially available thermoplastic polyolefin resin, and preferably polyethylene or polypropylene, may be advantageously used in the practice of the invention, with polypropylene being preferred.

Any curative or curative system applicable for vulcanization of monoolefin rubbers may be used in the practice of the invention, for example, peroxide-, azide- and accelerated sulfur-vulcanizing agents. The combination of a maleimide and disulfide accelerator can be used. For satisfactory curatives and curative systems, reference is made to columns 3-4 of U.S. Pat. No. 3,806,558, which disclosure is incorporated herein by reference. As explained above, sufficient quantities of curatives are used to achieve essentially complete cure of the rubber as determined by the increase in tensile strength, by the cross-link density, by the sol content (percent extractables), or combination thereof. Peroxide curatives are advantageously used in reduced quantities in conjunction with other curatives such as sulfur or bismaleimides providing the total amount of curatives is sufficient to vulcanize fully the rubber. High energy radiation is also utilizable as the curative but curative systems comprising sulfur-vulcanizing agents are preferred.

The properties of the thermoplastic vulcanizates of this invention may be modified, either before or after vulcanization, by addition of ingredients which are conventional in the compounding of monoolefin copolymer rubber, polyolefin resin and blends thereof. Examples of such ingredients include carbon black, silica, titanium dioxide, colored pigments, clay, zinc oxide, stearic acid, accelerators, vulcanizing agents, sulfur, stabilizers, antidegradants, processing aids, adhesives, tackifiers, plasticizers, wax, prevulcanization inhibitors, discontinuous fibers such as wood cellulose fibers and extender oils. The addition of carbon black, extender oil or both, preferably prior to dynamic vulcanization, are particularly recommended. Carbon black improves the tensile strength and extender oil can improve the resistance to oil swell, heat stability, hysteresis, cost and permanent set of the thermoplastic vulcanizate. Aromatic, naphthenic and paraffinic extender oils are satisfactory. The addition of extender oil can also improve processability. For suitable extender oils, refer to Rubber World Blue Book, supra, pages 145–190. The quantity of extender oil added depends upon the properties desired, with the upper limit depending upon the compatibility of the particular oil and blend ingredients which limit is exceeded when excessive exuding of extender oil occurs. Typically, 5-300 parts by weight extender oil are added per 100 parts by weight blend of olefin rubber and polyolefin resin. Commonly about 30 to 250 parts by weight of extender oil are added per 100 parts by weight of rubber present in the blend with quantities of about 70 to 200 parts by weight of extender oil per 100 parts by weight of rubber being preferred. Typical additions of carbon black comprise about 40-250 parts by weight of carbon black per 100 parts by weight of olefin rubber and usually about 20-100 parts by weight carbon black per 100 parts total weight of olefin rubber and extender oil. The amount of carbon black which can be used depends, at least in part, upon the type of black and the amount of extender oil to be used. The amount of extender oil depends, at least in part, upon the type of rubber. High viscosity rubbers are more highly oil extendable.

Thermoplastic elastomeric vulcanizates of the invention are useful for making a variety of articles such as tires, hoses, belts, gaskets, moldings and molded parts. They are particularly useful for making articles by extrusion, injection molding and compression molding techniques. They also are useful for modifying thermoplastic resins, in particular, polyolefin resins. The vulcanizates are blended with thermoplastic resins using conventional mixing equipment. The properties of the modified resin depend upon the amount of vulcanizate blended. Generally, the amount of vulcanizate is such that the modified resin contains about 5 to 25 parts by weight of olefin rubber per about 95 to 75 parts total weight of resin.

DESCRIPTION OF PREFERRED EMBODIMENTS

To illustrate the invention, low flow, general purpose polypropylene (specific gravity 0.902, 11% ultimate elongation) in the proportions indicated in Table I is mixed with EPDM rubber at 100 rpm in a Brabender mixer with an oil bath temperature of 182° C. for 4 minutes after which time the polypropylene is melted and a uniform blend is obtained. Hereinafter temperature of a Brabender mixer will be understood to be temperature of the oil bath. Zinc oxide (5 phr) and stearic acid (1 phr) are added and mixing is continued for one minute. The order of mixing can vary but all the above ingredients should be added and mixing essentially complete before vulcanization begins. The abbreviation "phr" means parts by weight per 100 parts by weight rubber. Tetramethyl thiuram disulfide (TMTD) and 2-bis(benzothiazolyl)disulfide (MBTS) are added and mixing is continued for another half minute. Sulfur is added and mixing is continued until the maximum Brabender consistency is reached and for 3 minutes thereafter. The vulcanizate is removed, sheeted on a mill, returned to the Brabender and mixed at the above indicated temperature for two minutes. The vulcanizate is again sheeted on a mill and then compression molded at 220° C. and cooled below 100° C. under pressure before removal. Properties of the molded sheet are measured and recorded. Data for various compositions are shown in Table I. The cross-link density is indicated by the symbol $\nu/2$ expressed in moles per milliliter of rubber. Stocks 1, 3, 6 and 10 are controls containing no curatives. Stocks 2, 4, 5, 7, 8, 9, and 11 illustrate vulcanizates of the invention.

The data illustrate fully cured vulcanizates of the invention characterized by less than 2 percent by weight rubber extractable in cyclohexane (gel content greater than 98 percent), high cross-link densities and tensile strengths well over 100 Kg/cm. greater than the unvulcanized controls. All vulcanizates are processable as thermoplastics and may be reprocessed without the need for any reclaiming in contrast to ordinary vulcanizates. All vulcanizates of Table I are elastomeric, meaning that they possess the property of forcibly retracting after being greatly distorted. The degree of distortion which a product will withstand to be classified as an elastomer is not subject to rigorous definition but, in general, should be at least 100%.

Thermoplastic vulcanizates containing carbon black and extender oil are illustrated in Table II. The ingredients and procedure are the same as in Stock 2-11 of Table I except that carbon black (N-327) and paraffinic extender oil (Sunpar 2280) are mixed with the rubber before adding the polypropylene. Physical properties of the vulcanizates are determined by ASTM procedure D-1708-66. Specimens are pulled with an Instron tester at one inch per minute up to 30% elongation and then 10 inches per minute to failure. All of the vulcanizates are processable. Tensile testing is the same for Table I.

The data show that even vulcanizates containing large amounts of extender oil possess respectable tensile strengths. The unvulcanized blends from which the oil extended thermoplastic vulcanizates having tensile strength below 100 Kg/cm$^2$ are prepared have very low tensile strengths and the tensile strengths of all the vulcanizates easily exceed the tensile strengths of the unvulcanized blends by 60 Kg/cm$^2$. By varying the ratio of olefin copolymer rubber and polyolefin resin and adding carbon black and extender oil, a wide variety of hardness and tensile strengths are obtained, all within the improved range. It will be appreciated that the vulcanizates of Table II represent economically attractive thermoplastics. At comparable hardness the tensile strengths of the thermoplastic vulcanizates of the invention exceed those of partially cured vulcanizates heretofore obtained from similar ingredients.

TABLE II

| Stock Number | 12 | 13 | 14 | 15 | 16 | 17 | 18 | 19 | 20 | 21 | 22 | 23 | 24 |
|---|---|---|---|---|---|---|---|---|---|---|---|---|---|
| Ingredients (besides zinc oxide and stearic acid) | | | | | | Parts by Weight | | | | | | | |
| EPDM Rubber | 65 | 65 | 65 | 65 | 65 | 65 | 65 | 45 | 45 | 45 | 45 | 35 | 35 |
| Polypropylene | 35 | 35 | 35 | 35 | 35 | 35 | 35 | 55 | 55 | 55 | 55 | 65 | 65 |
| Carbon Black | 26 | — | 26 | 26 | 52 | 52 | 52 | 36 | — | 36 | 36 | 7 | 7 |
| Extender Oil | — | 52 | 52 | 104 | — | 52 | 104 | — | 36 | 36 | 72 | 14 | 42 |
| TMTD | 0.65 | 0.65 | 0.65 | 0.65 | 0.65 | 0.65 | 0.65 | 0.45 | 0.45 | 0.45 | 0.45 | 0.35 | 0.35 |
| MBTS | 0.33 | 0.33 | 0.33 | 0.33 | 0.33 | 0.33 | 0.33 | 0.23 | 0.23 | 0.23 | 0.23 | 0.175 | 0.175 |
| Sulfur | 1.3 | 1.3 | 1.3 | 1.3 | 1.3 | 1.3 | 1.3 | 0.9 | 0.9 | 0.9 | 0.9 | 0.7 | 0.7 |
| Tensile Strength, Kg/cm$^2$ | 301 | 95 | 130 | 77 | 311 | 174 | 97 | 316 | 155 | 235 | 155 | 256 | 177 |
| 100% Modulus, Kg/cm$^2$ | 87 | 30 | 32 | 18 | 110 | 39 | 20 | 146 | 65 | 73 | 49 | 109 | 77 |
| Young's Modulus, Kg/cm$^2$ | 345 | 73 | 75 | 35 | 285 | 65 | 33 | 1228 | 482 | 236 | 117 | 1311 | 666 |
| Ult. Elongation, Percent | 410 | 470 | 470 | 550 | 310 | 400 | 510 | 410 | 550 | 530 | 490 | 570 | 530 |
| Hardness, Shore A | 91 | 69 | 70 | 61 | 93 | 76 | 61 | 98 | 89 | 90 | 74 | 97 | 91 |
| Hardness, Shore D | 34 | 18 | 19 | 12 | 39 | 20 | 14 | 51 | 29 | 33 | 22 | 46 | 34 |
| Tension Set, percent | 11 | 7 | 7 | 5 | 13 | 7 | 6 | 30 | 19 | 16 | 13 | 33 | 24 |

The Table III data illustrate advancing the state of cure of partially vulcanized blends by further mixing with additional curatives and show that thermoplastic elastomers having dramatically increased tensile strengths are produced thereby. Control Stock 25 is prepared according to the procedure of Table I using

TABLE I

| Stock Number | 1 | 2 | 3 | 4 | 5 | 6 | 7 | 8 | 9 | 10 | 11 |
|---|---|---|---|---|---|---|---|---|---|---|---|
| Ingredients (besides zinc oxide and stearic acid) | | | | | | Parts by Weight | | | | | |
| EPDM Rubber | 75* | 75 | 70 | 70 | 65 | 60 | 60 | 55 | 45 | 30 | 30 |
| Polypropylene | 25 | 25 | 30 | 30 | 35 | 40 | 40 | 45 | 55 | 70 | 70 |
| TMTD | — | 0.375 | — | 0.7 | 0.65 | — | 0.6 | 0.55 | 0.45 | — | 0.75 |
| MBTS | — | 0.188 | — | 0.35 | 0.33 | — | 0.3 | 0.28 | 0.23 | — | 0.38 |
| Sulfur | — | 0.75 | — | 1.4 | 1.3 | — | 1.2 | 1.1 | 0.9 | — | 1.5 |
| Gel, percent | — | 99.0 | 60.0 | 99.6 | 99.0 | 67 | 98.6 | 98.9 | 98.6 | 93 | 99.5 |
| Swell, percent | — | 245 | 543 | 187 | 150 | 316 | 145 | 148 | 106 | 91 | 73 |
| $\nu/2 \times 10^5$ | 0 | 12.3 | 0 | 16.4 | 16.4 | 0 | 16.4 | 16.4 | 16.4 | 0 | 14.5 |
| Tensile Strength, Kg/cm$^2$ | 11.2 | 130 | 19.7 | 183 | 256 | 50.4 | 248 | 251 | 280 | 145 | 294 |
| 100% Modulus, Kg/cm$^2$ | 12.6 | 39.4 | 20.4 | 56.9 | 77.3 | 49.3 | 81.6 | 86.5 | 115 | 137 | 139 |
| Young's Modulus, Kg/cm$^2$ | 58.3 | 133 | 111 | 222 | 318 | 730 | 593 | 835 | 1656 | 4697 | 4436 |
| Ult. Elongation, percent | 180 | 480 | 180 | 470 | 460 | 190 | 530 | 550 | 560 | 370 | 580 |

*Believed to be terpolymer of 55% weight ethylene, 42.5% weight propylene, and 2.5% by weight diene, polydispersity greater than 20, Mooney viscosity 55 (ML-8, 100° C). The rubber in Stocks 2-11 is believed to be terpolymer of 55% by weight ethylene, 40.6% by weight propylene, 4.4% diene, polydispersity 2.5, Mooney viscosity 100 (ML-8, 100° C).

the same polypropylene as in Table I but using limited quantities of curatives sufficient to obtain only a partially cured vulcanizate. Stock 26 is prepared from the partially cured vulcanizate of Stock 25 by remixing it with additional curatives to bring the total quantities of curatives to the levels indicated and then vulcanized further during continuing mixing in a Brabender mixer for a total of 5 minutes at 180° C. Stock 27 (a control for Stock 28) is a commercially available thermoplastic rubber (TPR) which is believed to be a dynamically partially cured blend of olefin copolymer rubber and polypropylene. Stock 28 is prepared from Stock 27 by mixing it with the indicated quantities of curatives and then masticating it in a Brabender mixer for a total of five minutes at 180° C. Stock 29 (a control for Stock 30) is prepared from blow molding grade polyethylene, melt index 0.6 gm/10 min., sp. g. 0.960, ultimate elongation 600%. Stock 30 is prepared from Stock 29 by masticating it in a Brabender, adding the curatives and then continuing mixing until cure is complete. All of the stocks are processable as thermoplastics.

Stocks 25 and 26 show that tensile strength is substantially increased by curing the blend of EPDM rubber having high polydispersity to the extent that the rubber has a crosslink density greater than $7 \times 10^{-5}$. Stocks 27 and 28 show that the tensile strength is substantially increased by further curing a partially cured blend characterized by 91% gel content to the extent that the gel content exceeds 97 percent. Stock 30 illustrates a thermoplastic elastomeric vulcanizate of high cross-link density containing polyethylene and shows that tensile strength and modulus are both substantially increased as compared to unvulcanized control Stock 29.

TABLE III

| Stock No. | 25 | 26 | 27 | 28 | 29 | 30 |
|---|---|---|---|---|---|---|
| Ingredients | Parts by Weight | | | | | |
| Commercial TPR | — | — | 100 | 100 | — | — |
| EPDM Rubber | 60* | 60* | — | — | 60** | 60** |
| Polypropylene | 40 | 40 | — | — | — | — |
| Polyethylene | — | — | — | — | 40 | 40 |
| Zinc Oxide | 3.0 | 3.0 | — | 3.0 | — | 3.0 |
| Stearic Acid | 0.6 | 0.6 | — | 0.6 | — | 0.6 |
| TMTD | 0.15 | 0.9 | — | 0.6 | — | 0.9 |
| MBTS | 0.075 | 0.45 | — | 0.3 | — | 0.45 |
| Sulfur | 0.3 | 1.8 | — | 1.2 | — | 1.8 |
| Gel, percent | 92.5 | 94.5 | 91.0 | 99.3 | — | — |
| $\nu/2 \times 10^5$ | 1.6 | >8.5 | — | — | 0 | ≈15 |
| Tensile Strength, Kg/cm$^2$ | 83 | 144 | 69 | 150 | 54 | 167 |
| 100% Modulus, Kg/cm$^2$ | 62 | 72 | 61 | 74 | 46 | 77 |
| Ult. Elongation, percent | 390 | 480 | 200 | 420 | 710 | 610 |

*Believed to be terpolymer of 55% by weight ethylene, 42.5% polypropylene and 2.5% diene; polydispersity greater than 20, Mooney viscosity 90 (ML-8, 100° C).
**Believed to be similar to the EPDM of Stocks 25 and 26 except the diene is 5% and the propylene is 40%.

A thermoplastic elastomeric vulcanizate of the invention prepared with a non-sulfur curative system comprising a peroxide and phenylene bismaleimide (HVA-2) and from the same EPDM rubber as in Stock 1 is illustrated by Stock 34 in Table IV. The peroxide is 40% dicumyl peroxide (DiCup 40C). Stocks 31-33, containing same kind of EPDM, are outside of the invention. Stock 31 is a control without curatives and Stocks 32 and 33 illustrate the properties of insufficiently cured vulcanizates. All stocks are prepared in a Brabender mixer at 180° C. from polypropylene of specific gravity of 0.905, ultimate elongation of 100% and using a total mixing time of four minutes after adding the curatives. Stock 34 is processable and demonstrates the preparation of a processable thermoplastic from high amounts of a peroxide curative system. The stock is fully cured as evidenced by much higher tensile strength than the uncured and insufficiently cured controls.

TABLE IV

| Stock Number | 31 | 32 | 33 | 34 |
|---|---|---|---|---|
| Ingredients | Parts by Weight | | | |
| EPDM rubber | 62.5 | 62.5 | 62.5 | 62.5 |
| Polypropylene | 37.5 | 37.5 | 37.5 | 37.5 |
| DiCup 40C | — | 1.68 | — | 1.68 |
| HVA-2 | — | — | 2.26 | 2.26 |
| Tensile Strength, Kg/cm$^2$ | 52.0 | 51.3 | 61.9 | 113.9 |
| 100% Modulus, Kg/cm$^2$ | 49.2 | 45.7 | 58.4 | 61.2 |
| Young's Modulus, Kg/cm$^2$ | 683 | 464 | 987 | 446 |
| Ult. Elongation, percent | 210 | 190 | 250 | 360 |

The use of thermoplastic elastomeric vulcanizates of the invention as modifiers for polyolefin resin is illustrated by Stock 37 in Table V and attainment of similar properties by forming the vulcanizates in situ is illustrated by Stock 38. The ingredient designated "polypropylene" in Stocks 35, 36 and 38 is a polypropylene homopolymer having a nominal melt flow of 0.4 g/10 min., density 0.905 g/cc at 22.7° C., 13% elongation at yield and greater than 200% ultimate elongation and in Stock 37 it is the aforesaid homopolymer supplemented by polypropylene of Stock 7. Stock 35 is a control with polypropylene alone. Stock 36 is a control with polypropylene containing 15 percent by weight uncured EPDM rubber (same EPDM rubber as in Stock 7). Stock 37 illustrates polypropylene containing sufficient thermoplastic elastomeric vulcanizate of the invention (Stock 7 of Table I) to give a composition having a total of about 85 parts polypropylene and 15 parts EPDM rubber. About 25.5 parts of Stock 7 (which is the equivalent of about 15 parts EPDM, 10 parts polypropylene and 0.5 parts curative) are mixed with a quantity of the same polypropylene as in Stocks 35, 36, and 38 to give the desired total of about 85 parts polypropylene. The blends are mixed at 182° C. for 8 minutes in a Brabender mixer. Stock 38 illustrates a composition similar to Stock 37 but, instead of mixing a vulcanizate with polypropylene, the EPDM rubber, activators and curatives (same rubber with zinc oxide, stearic acid and curative as in Stock 7) are added to the polypropylene and the vulcanizate is prepared in situ via the procedure of Table I. The data demonstrate that Stocks 37 and 38 have improved toughness and the true stress at break indicates improved impact resistance.

TABLE V

| Stock Number | 35 | 36 | 37 | 38 |
|---|---|---|---|---|
| Ingredients (except for zinc oxide and stearic acid in Stocks 37 and 38) | Parts by Weight | | | |
| Polypropylene | 100 | 85 | 85 | 85 |
| EPDM Rubber | — | 15 | 15* | 15 |
| Curatives | — | — | 0.5 | 0.5 |
| Tensile Strength at break, Kg/cm$^2$ | 212 | 191 | 270 | 280 |
| 100 Modulus, Kg/cm$^2$ | 203 | 176 | 191 | 204 |
| Ult. Elongation, percent | 520 | 570 | 540 | 570 |
| True stress at break,** Kg/cm$^2$ | 1300 | 1270 | 1730 | 1870 |

*From Stock 7
**True stress at break is the product of tensile strength at break times the ultimate extension ratio, [(ultimate elongation, %/100)+ 1].

The preparation of thermoplastic elastomeric vulcanizates of the invention using peroxide curatives alone is demonstrated in Table VI. The EPDM of Stocks 39 and 40 is believed to be a polymer of 58 percent by weight ethylene, 32.5 percent by weight propylene and 9.5 percent by weight diene, the EPDM having polydispersity of 2.4, Mooney viscosity of 50 (ML-8, 100° C.).

TABLE VI

| Stock Number | 39 | 40 | 41 | 42 |
|---|---|---|---|---|
| Ingredients | | Parts by Weight | | |
| Polypropylene | 60 | 60 | 60 | 60 |
| EPDM Rubber | 40 | 40 | 40 | 40 |
| 2,5-Dimethyl-2,5-di(t-butylperoxy)hexane | — | 0.99 | — | 0.99 |
| Gel, percent | — | 98.2 | — | 95.3 |
| $\nu/2 \times 10^5$ | 0 | 18.17 | 0 | 5.0 |
| Tensile strength at break, $Kg/cm^2$ | 60.4 | 144.8 | 47.8 | 90.0 |
| True stress at break, $Kg/cm^2$ | 195.5 | 646.8 | 131.5 | 428.9 |

Both the crosslink density and percent gel of Stock 40 are sufficient to give a substantial increase in tensile strength. The EPDM of Stocks 41 and 42 is the same as that in Stock 25. In the case of Stock 42 the rubber is not efficiently vulcanized and the substantial increase in tensile strength due to the dynamic vulcanization does not occur.

Methods other than the dynamic vulcanization of rubber/resin blends can be utilized to prepare compositions of the invention. For example, the rubber can be fully vulcanized in the absence of the resin, either dynamically or statically, powdered, and mixed with the resin at a temperature above the melting or softening point of the resin. Provided that the fully cured rubber particles are small, well dispersed and in an appropriate concentration, the compositions within the invention are easily obtained by blending fully cured rubber and resin. Accordingly, the term "blend" herein means a mixture comprising well dispersed small particles of rubber. A mixture which is outside of the invention because it contains poorly dispersed or too large particles can be comminuted by cold milling (to reduce particle size to below about 50μ) or pulverization and thereby reclaimed. After sufficient comminution or pulverization, a composition of the invention is obtained. Frequently, the case of poor dispersion or too large rubber particles is visibly obvious to the naked eye and observable in a molded sheet. This is especially true in the absence of pigments and fillers. In such a case, pulverization and remolding gives a sheet in which aggregates of rubber particles or large particles are not obvious or are far less obvious to the naked eye and mechanical properties are greatly improved.

The aforesaid principles and method of preparing compositions of the invention by mixing vulcanized rubber with resin are illustrated by the following example. One hundred parts by weight of the EPDM of Stock 2 is mixed with 5 parts of zinc oxide, 1 part of stearic acid, 1.5 parts of sulfur, 1.0 part of TMTD and 0.5 part of MBTS and cured in a Brabender during mixing with the oil temperature at 180° C. Scorch occurs and a vulcanized powder is obtained. Mixing is continued for about 3 minutes after scorch occurs. The vulcanized, powdered rubber (which includes zinc oxide, stearic acid and curatives) is mixed in a Brabender with molten polypropylene which is the same as the polypropylene of Stock 2. The mixture contains 70.8 parts of the vulcanized rubber powder and 35 parts polypropylene. The molten mass, when pressed between cold plates, is observed to contain particles or aggregates of particles of rubber which are visibly obvious to the naked eye. The mixture is then comminuted to a fine powder by cold milling on a very tight roll mill. The powdered composition is remixed in the hot Brabender. A molten mass again forms which can be milled to a sheet. The composition is press molded at 220° C. as before. The properties of the molded sheet, which contains very few visible particles or aggregates, are those of Stock 43 in Table VII. Stock 44 is an unvulcanized control. The strength of Stock 43 is more than 100 $Kg/cm^2$ greater than that of the unvulcanized blend, Stock 44. Stock 43, however, is not as strong as Stock 5 of Table I which is a similar stock prepared by dynamic vulcanization and which contains 0.5 parts more of sulfur per 100 parts of rubber. It is probable that the dynamic vulcanization method ordinarily gives smaller dispersed rubber particles (less than 1–10μ).

It is obvious from the above that the comminution of highly scorched stocks, rejected vulcanized conventional rubber parts, and worn out rubber parts can give renewed utility to what would normally be waste, or, at best, fuel. The comminuted cured waste or scrap rubber can be mixed with molten resin to give useful thermoplastic compositions.

TABLE VII

| Stock Number | 43 | 44 |
|---|---|---|
| Vulcanized EPDM | 70.8* | — |
| Unvulcanized EPDM | — | 65 |
| Polypropylene | 35 | 35 |
| $\nu/2 \times 10^5$ | ca 14 | 0 |
| Tensile strength, $Kg/cm^2$ | 147.8 | 35.9 |
| 100% Modulus, $Kg/cm^2$ | 69.2 | 35.5 |
| Young's Modulus, $Kg/cm^2$ | 701 | 333 |
| Ult. Elongation, Percent | 423 | 192 |

*The vulcanized EPDM comprises 65 parts of rubber. The rest is zinc oxide, stearic acid, and curvatives.

As noted from the foregoing, the proportions of ingredients which yield thermoplastic elastomers will vary somewhat with the particular resin, rubber and compounding ingredients selected. The blends from which thermoplastic elastomeric vulcanizates of the invention are prepared comprise about 25 to about 85 parts by weight of the polyolefin resin and about 75 to about 15 parts by weight of vulcanized monoolefin copolymer rubber per 100 parts total weight of resin and rubber, and 0–300 parts by weight of extender oil per 100 parts by weight of rubber. When the proportion of polyolefin resin exceeds 75 parts by weight per 100 total parts by weight of resin and rubber, there must be sufficient extender oil present to maintain elasticity in the vulcanizate. Thermoplastic elastomeric compositions comprising fully cured rubber are obtained whenever $(W_o + W_R)/Wp$ is equal to or greater than 0.33, preferably 0.50 or more, wherein $W_o$ is the weight of extender oil, $W_R$ is the weight of rubber and $W_P$ is the weight of resin. The addition of fillers such as carbon black or rubber extender oil and combinations of the two additives permits compounding vulcanizates of the invention with essentially unlimited range of properties. The addition of carbon black ordinarily increases the tensile strength, whereas, the addition of extender oil ordinarily reduces hardness and tension set. As indicated above, in blends containing high proportions of resin sufficient extender oil must be used so that an adequate combined quantity of rubber and extender oil is present in order to obtain thermoplastic elastomeric vulcanizates.

When fillers such as carbon black or silica are compounded with the blends, it is desirable that such additives are intimately mixed with the rubber before mixing the rubber with resin. One embodiment of the invention for making a thermoplastic elastomeric filled composition comprises blending at a temperature to soften the that the presence of extender oil imparts elasticity to compositions containing high proportions of resin which compositions without the extender oil exhibit significantly high tension set values.

TABLE VIII

| Stock Number | 45 | 46 | 47 | 48 | 49 | 50 | 51 | 52 |
|---|---|---|---|---|---|---|---|---|
| Ingredients (besides zinc oxide and stearic acid) | | | | Parts by Weight | | | | |
| EPDM Rubber | 25 | 25 | 25 | 25 | 17.5 | 17.5 | 17.5 | 15 |
| Polypropylene | 75 | 75 | 75 | 75 | 82.5 | 82.5 | 82.5 | 85 |
| Carbon black | — | — | 37.5 | 75 | — | 26.25 | 52.5 | — |
| Extender oil | — | 50 | 37.5 | 50 | 26.25 | 26.25 | 26.25 | 30 |
| TMTD | 0.25 | 0.25 | 0.25 | 0.25 | 0.175 | 0.175 | 0.175 | 01.75 |
| MBTS | 0.125 | 0.125 | 0.125 | 0.125 | 0.088 | 0.088 | 0.088 | 0.188 |
| Sulfur | 0.375 | 0.375 | 0.375 | 0.375 | 0.263 | 0.263 | 0.263 | 0.75 |
| Tensile strength, Kg./cm$^2$ | 337 | 98 | 146 | 116 | 174 | 160 | 164 | 145 |
| 100% Modulus, Kg./cm$^2$ | 159 | 82 | 107 | 72 | 127 | 132 | 143 | 130 |
| Young's Modulus, Kg./cm$^2$ | 4078 | 839 | 1232 | 709 | 1990 | 1940 | 1860 | 1997 |
| Ult. Elongation, percent | 630 | 270 | 330 | 160 | 440 | 300 | 230 | 290 |
| Hardness, Shore D | 61 | 39 | 45 | 43 | 51 | 54 | 54 | 55 |
| Tension Set, percent | 57 | 36 | 37 | 44 | 53 | 46 | 48 | 53 |
| $(W_o + W_R)/W_P$ | 0.33 | 1.0 | 0.83 | 1.0 | 0.53 | 0.53 | 0.53 | 0.53 | resin, (a) about 25 to about 85 parts by weight of thermoplastic polyolefin resin, (b) about 75 to about 15 parts by weight monoolefin copolymer rubber, and (c) about 5–300 parts by weight filler per 100 parts total weight of resin and rubber in the final composition, wherein (a) is blended with a preformed homogeneous mixture of rubber and filler and the blend then masticated continuously at vulcanization temperature until vulcanization is complete. A preferred process comprises blending in the aforesaid manner about 35–75 parts by weight of resin per 100 total parts by weight of resin and rubber and a preformed homogeneous mixture of 65–25 parts by weight of rubber and about 40–250 parts by weight of filler per 100 parts by weight of rubber. Of course, it is understood that sufficient vulcanizing agent(s) is present to form a vulcanizable rubber composition. Preferably, vulcanizing agent is added to a blend of (a), (b) and (c), however, it may be added to a preformed mixture of (b) and (c) or it may be added to the rubber alone. Thus, an unvulcanized but vulcanizable composition containing vulcanizing agent is prepared by blending the resin with a preformed mixture of rubber and filler and subsequently dynamically vulcanizing the blend to obtain a thermoplastic elastomeric filled composition.

Mixing the rubber and filler before blending with the resin results in vulcanizates having improved properties including higher tensile strengths and lower tension set as compared to similar compositions prepared by mixing all three components simultaneously or by mixing filler with a preformed mixture of rubber and resin. To obtain improved properties when extender oil is present in the vulcanizates, it is advantageous to add the resin last. As before, it is important either to mix the filler with the rubber before mixing the extender oil or to mix the filler and extender oil simultaneously with the rubber. On the other hand, the rubber may be mixed with the extender oil first, with good results provided the rubber has sufficient viscosity. Thus, commercially available oil-extended EPDM rubber may be advantageously used in the aforesaid improved process for preparing filled compositions of the invention.

Thermoplastic elastomeric compositions of the invention prepared using the same ingredients as in Table II but with higher proportions of resin are shown in Table VIII. The data show that elastomeric compositions are obtained when the amount of resin is greater than 75 parts by weight if extender oil is present. Stocks 45-48 demonstrate that extender oil greatly improves the elasticity of the compositions. Stocks 49–52 demonstrate Certain compositions of the invention exhibit hot oil resistance comparable to that reported for neoprene vulcanizates. For example, the percent weight swell in ASTM #3 oil at 100° C. for 70 hours of Stocks 16, 17, 19-24 of Table II is 88, 96, 84, 83, 73, 61, 61 and 51, respectively. In general, it has been found that the higher the cross-link density of the rubber the higher resistance of the composition to hot oil swelling. Thus, blending polyolefin resin and EPDM rubber and fully curing the rubber dynamically offers a means for preparing thermoplastic elastomeric compositions exhibiting substantial resistance to oil swell which result is unexpected since cured EPDM rubber alone has poor resistance to oil swell.

The term "elastomeric" as used herein and the claims means a composition which possesses the property of forcibly retracting within one minute to less than 60% of its original length after being stretched at room temperature to twice its length and held for one minute before release. Especially preferred compositions of the invention are rubbery compositions having tension set values of about 50% or less which compositions meet the definition for rubber as defined by ASTM Standards, V. 28, p. 756 (D1566). More preferred compositions are rubbery compositions having a Shore D hardness of 60 or below or a 100% modulus of 150 Kg./cm$^2$ or less or a Young's modulus below 1000 Kg./cm$^2$.

As indicated above, thermoplastic elastomeric compositions of the invention are prepared by masticating continuously a vulcanizable composition until vulcanization is complete. The phrase "until vulcanization is complete" means that essentially all the vulcanizing ingredients have been consumed so that the vulcanization reaction is essentially over, which condition is generally indicated when no further change in consistency is observed.

Although the invention has been illustrated by typical examples, it is not limited thereto. Changes and modifications of the examples of the invention herein chosen for purposes of disclosure can be made which do not constitute departure from the spirit and scope of the invention.

The embodiment of the invention in which an exclusive property or privilege is claimed are defined as follows:

1. A thermoplastic elastomeric composition comprising a blend of about 25 to about 85 parts by weight of crystalline thermoplastic polyolefin resin and about 75 to about 15 parts by weight of vulcanized monoolefin copolymer rubber per 100 parts total weight of said resin and rubber, and extender oil up to 300 parts by weight per 100 parts by weight of rubber provided that, when the amount of resin is greater than 75 parts by weight, extender oil must be present in an amount sufficient to satisfy the equation $(W_o + W_R)/W_P$ is equal to or greater than 0.33 wherein $W_o$ is the weight of extender oil, $W_R$ is the weight of rubber and $W_P$ is the weight of resin, wherein the rubber in said blend is a polymer of monomers comprising ethylene or propylene, and at least one other alpha olefin of the formula $CH_2 = CHR$ in which R is alkyl of 1-12 carbon atoms and from none to a minor portion of at least one copolymerizable diene in the form of small dispersed particles essentially of a size of about 50 microns or below and is vulcanized to the extent that no more than about three percent of the rubber is extractable in cyclohexane at 23° C. or that the cross-link density determined on the same monoolefin copolymer rubber as in the blend is greater than about $7 \times 10^{-5}$ moles per ml of rubber, the composition being processable in an internal mixer to a product which, upon transferring, with the resin in the molten state, to the rotating rolls of a rubber mill forms an essentially continuous sheet.

2. The composition of claim 1 in which the resin is polypropylene and the rubber is EPDM rubber which is a product from the polymerization of ethylene, propylene and a lesser quantity of a non-conjugated diene, in the proportions of about 25-75 parts by weight polypropylene and about 75-25 parts by weight of EPDM rubber.

3. The composition of claim 1 containing about 30 to 250 parts by weight extender oil per 100 parts by weight of rubber.

4. The composition of claim 1 in which $(W_o + W_R)/W_P$ is equal to or greater than 0.5.

5. The composition of claim 3 in which the rubber is vulcanized to the extent that the blend has a tensile strength at least about 60 Kg./sq.cm. greater than that of the unvulcanized blend.

6. A thermoplastic elastomeric composition comprising a blend of
   (a) about 25-75 parts by weight of crystalline thermoplastic polyolefin resin and
   (b) about 75-25 parts by weight of vulcanized monoolefin copolymer rubber, the rubber being a polymer of monomers comprising ethylene or propylene, and at least one other alpha olefin of the formula $CH_2 = CHR$ in which R is alkyl of 1 to 12 carbon atoms and from none to a minor portion of at least one copolymerizable diene, and being sufficiently small dispersed particles vulcanized to the extent that the blend has a tensile strength at least about 60 Kg./sq.cm. greater than that of the unvulcanized blend, the composition being processable in an internal mixer to a product which, upon transferring, with the resin in the molten state, to the rotating rolls of a rubber mill forms an essentially continuous sheet.

7. The composition of claim 6 in which the rubber is vulcanized to the extent either that no more than three percent by weight of the rubber is extractable in cyclohexane at 23° C. or that the cross-link density determined on the same monoolefin copolymer rubber as in the composition is greater than about $7 \times 10^{-5}$ moles per ml of rubber.

8. The composition of claim 6 in which the rubber is vulcanized to the extent that no more than three percent by weight of the rubber is extractable in cyclohexane at 23° C.

9. The composition of claim 8 in which the resin is polypropylene or polyethylene and the rubber is EPDM rubber which is a product from the polymerization of ethylene, propylene and a lesser quantity of a non-conjugated diene.

10. The composition of claim 9 in which the resin is polypropylene.

11. The composition of claim 10 in which the cross-link density determined on the same EPDM rubber as in the blend is greater than $7 \times 10^{-5}$ moles per ml of rubber.

12. The composition of claim 11 in which the blend comprises about 30 to about 70 parts by weight polypropylene and about 30 to about 70 parts by weight EPDM rubber.

13. The composition of claim 12 which is vulcanized by a sulfur-vulcanizing agent.

14. The composition of claim 12 in which the rubber is dispersed particles smaller than about 50 microns.

15. The composition of claim 14 having a tensile strength of about 100 Kg./sq.cm. greater than that of the unvulcanized composition.

16. The composition of claim 7 which is vulcanized to the extent that the cross-link density is greater than $7 \times 10^{-5}$ moles per ml of rubber.

17. The composition of claim 16 in which the resin is polypropylene and the rubber is EPDM rubber which is a product from the polymerization of ethylene, propylene and a lesser quantity of a non-conjugated diene.

18. The composition of claim 17 in which the blend comprises about 30 to about 70 parts by weight polypropylene and about 30 to about 70 parts by weight EPDM rubber and the diene is ethylidene norbornene.

19. The composition of claim 18 which is vulcanized by a sulfur-vulcanizing agent.

20. The composition of claim 18 in which the rubber is dispersed particles smaller than about 10 microns.

21. The composition of claim 20 having a tensile strength of about 100 Kg./sq.cm. greater than that of the unvulcanized composition.

22. The composition of claim 6 containing about 30 to about 250 parts by weight extender oil.

23. The composition of claim 9 containing about 30 to 250 parts by weight extender oil per 100 parts by weight of rubber.

24. The composition of claim 15 containing about 30 to 250 parts by weight extender oil per 100 parts by weight of rubber.

25. The composition of claim 23 in which the blend contains carbon black in the amount of 2-250 parts by weight per 100 parts by weight rubber.

26. The composition of claim 24 in which the diene is ethylidene norbornene.

27. The composition of claim 9 in which the resin is polyethylene.

28. The composition of claim 22 containing 20 to 100 parts by weight carbon black per 100 parts total weight of rubber and extender oil.

29. The composition of claim 1 containing 5-300 parts by weight extender oil per 100 parts total weight of rubber and olefin resin and 20-100 parts by weight carbon black per 100 parts total weight of rubber and extender oil.

30. The composition of claim 24 in which the polydispersity of the rubber prior to vulcanization is less than about 3.5.

31. The composition of claim 16 in which the polydispersity of the rubber prior to vulcanization is less than about 3.5.

32. The composition of claim 1 which is prepared by the dynamic vulcanization of the unvulcanized blend.

33. The composition of claim 10 which is prepared by the dynamic vulcanization of the unvulcanized blend.

34. The composition of claim 33 which the rubber is vulcanized to the extent that no more than three percent by weight of the rubber is extractable in cyclohexane at 23° C. or that the cross-link density determined on the same monoolefin copolymer rubber as in the composition is greater than about $7 \times 10^{-5}$ moles per ml of rubber.

35. The composition of claim 34 in which the polypropylene is about 30 to about 70 parts by weight and the EPDM rubber is about 70 to about 30 parts.

36. The method of preparing useful compositions which comprises blending vulcanized rubber particles essentially of a size of about 50 microns or below, said rubber being a polymer of monomers comprising ethylene or propylene, and at least one other alpha olefin of the formula $CH_2 = CHR$ in which R is alkyl of 1 to 12 carbon atoms and from none to a minor portion of at least one copolymerizable diene, and molten thermoplastic polyolefin resin which is crystalline in the non-molten state, in amounts sufficient to render the resultant blend elastomeric and processable as a thermoplastic; said rubber being further characterized in that the rubber has been vulcanized, prior to blending, to the extent that said resultant blend has a tensile strength at least about 60 Kg./sq.cm. greater than the same blend except the rubber in the blend is unvulcanized, said composition being processable in an internal mixer to a product which, upon transferring, with said resin in the molten state, to the rotating rolls of a rubber mill forms an essentially continuous sheet.

37. A process of making a thermoplastic filled elastomeric composition which comprises blending
(a) about 25-75 parts by weight of crystalline thermoplastic polyolefin resin and
(b) about 75-25 parts by weight of a homogeneous mixture of unvulcanized but vulcanizable monoolefin copolymer rubber and filler at a temperature sufficient to melt said resin, adding vulcanizing ingredients to the blend of (a) and (b) to form a vulcanizable blend,
then masticating the blend continuously at vulcanization temperature until the rubber, a polymer of monomers comprising ethylene or propylene, and at least one other alpha olefin of the formula $CH_2 = CHR$ in which R is alkyl of 1 to 12 carbon atoms and from none to a minor portion of at least one copolymerizable diene, is sufficiently small dispersed particles vulcanized to the extent that the blend has a tensile strength at least 60 Kg./sq.cm. greater than that of the unvulcanized blend, said composition being processable in an internal mixer to a product which, upon transferring, with said resin in the molten state, to the rotating rolls of a rubber mill forms an essentially continuous sheet.

38. The process of claim 37 in which the filler is carbon black in an amount of 2-250 parts by weight per 100 parts by weight rubber.

39. The process of claim 38 in which the mixture (b) contains extender oil in an amount of 5-300 parts by weight per 100 parts total weight of rubber and resin.

40. The process of claim 39 wherein the thermoplastic resin is polypropylene and the rubber is a copolymer of monomers comprising ethylene, propylene and and a lesser quantity of a con-conjugated diene.

41. A process of making a thermoplastic elastomeric filled composition comprising
(a) about 25-85 parts by weight of crystalline thermoplastic polyolefin resin,
(b) about 75-15 parts by weight of monoolefin copolymer rubber per 100 parts total of resin and rubber, and extender oil up to 300 parts by weight per 100 parts by weight of rubber provided that, when the amount of resin is greater than 75 parts by weight, extender oil must be present in an amount sufficient to satisfy the equation $(W_o + W_R)/W_P$ is equal to or greater than 0.33 wherein $W_o$ is the weight of extender oil, $W_R$ is the weight of rubber and $W_P$ is the weight of resin, and
(c) about 5-300 parts by weight filler per 100 parts total weight of resin and rubber in the final composition
which comprises blending (a) with a preformed mixture of (b) and (c) and vulcanizing ingredients, at a temperature sufficient to melt said resin,
then masticating the blend continuously at vulcanization temperature until the rubber, a polymer of monomers comprising ethylene or propylene, and at least one other alpha olefin of the formula $CH_2 = CHR$ in which R is alkyl of 1 to 12 carbon atoms and from none to a minor portion of at least one copolymerizable diene, is sufficiently small dispersed particles vulcanized to the extent that the blend has a tensile strength at least 60 Kg./sq.cm. greater than that of the unvulcanized blend, said composition being processable in an internal mixer to a product which, upon transferring, with said resin in the molten state, to the rotating rolls of a rubber mill forms an essentially continuous sheet.

42. The process of claim 41 in which 30-250 parts by weight extender oil per 100 parts by weight rubber is employed.

43. The process of claim 41 which comprises blending
(a) about 35-75 parts by weight of resin,
(b) about 65-25 parts by weight of rubber, and
(c) about 40-250 parts by weight of carbon black per 100 parts by weight of rubber.

44. The process of claim 43 in which the resin is polypropylene and the rubber is a copolymer of monomers comprising ethylene, propylene and and a lesser quantity of a non-conjugated diene.

45. The process of claim 44 in which extender oil is employed in an amount of about 30 to about 250 parts by weight per 100 parts by weight rubber.

46. A process of making a thermoplastic elastomeric composition which comprises preparing an unvulcanized but vulcanizable composition by blending
(a) about 25 to about 85 parts by weight of crystalline thermoplastic polyolefin resin,
(b) about 75 to about 15 parts by weight of monoolefin copolymer rubber per 100 parts total weight of resin and rubber, which rubber is a polymer of monomers comprising ethylene or propylene, and at least one other alpha olefin of the formula $CH_2 = CHR$ in which R is alkyl of 1-12 carbon atoms and from none to a minor amount of at least one copolymerizable diene, (c) one or more vulcanizing ingredients, in an amount sufficient to vulcanize the rubber to the extent that no more three three percent of the rubber is extractable in cyclohexane at 23° C. or that the crosslink density determined on the same monoolefin copolymer rubber as in the composition is greater than about $7 \times 10^{-5}$ moles per ml of rubber, and (d) extender oil up to 300 parts by weight per 100 parts by weight of rubber provided that, when the amount of resin is greater than 75 parts by weight, extender oil must be present in an amount sufficient to satisfy the equation $(W_o + W_R)/W_P$ is equal to or greater than 0.33 wherein $W_o$ is the weight of extender oil, $W_R$ is the weight of rubber and $W_P$ is the weight of resin, at a temperature sufficient to soften said resin then masticating the blend continuously at vulcanization temperature until the rubber is small dispersed particles of such size and vulcanized to the extent that the blend has a tensile strength at least 60 Kg./sq.cm. greater than that of the unvulcanized blend, giving a composition processable in an internal mixer to a product which, upon transferring, with the resin in the molten state, to the rotating rolls of a rubber mill forms an essentially continuous sheet.

47. The process of claim 46 in which the resin is polypropylene and the rubber is EPDM rubber which is a product from the polymerization of ethylene, propylene and a lesser quantity of a non-conjugated diene in the proportions of about 30 to about 70 parts by weight polypropylene and about 30 to 70 parts by weight of said rubber per 100 parts total weight of polypropylene and rubber.

48. A thermoplastic elastomeric composition comprising a blend of about 30 to about 70 parts by weight of crystalline polypropylene, about 70 to about 30 parts by weight of vulcanized monoolefin rubber, per 100 parts total weight of said polypropylene and rubber and from about 30 to about 250 parts by weight of extender oil per 100 parts by weight of said rubber, wherein the rubber in said blend is a polymer of ethylene, propylene and a minor proportion of at least one copolymerizable non-conjugated diene and is present in said blend in the form of small dispersed particles essentially of a size of about 50 microns or below and is vulcanized to the extent that the blend has a tensile strength at least about 60 Kg./sq.cm. greater than that of the unvulcanized blend and no more than 3% by weight of the rubber is extractable in cyclohexane at 23° C., the composition being processable in an internal mixer to a product which, upon transferring with the polypropylene in the molten state, to the rotating rolls of a rubber mill forms an essentially continuous elastomeric sheet.

49. The composition of claim 48 containing a filler dispersed therein.

50. The composition of claim 48 in which the diene is ethylidene norbornene.

51. The composition of claim 48 containing dispersed therein from about 2 to 250 parts by weight of carbon black per 100 parts by weight of rubber.

52. The composition of claim 50 in which the extender oil is a paraffinic extender oil.

* * * * *

UNITED STATES PATENT OFFICE
CERTIFICATE OF CORRECTION

PATENT NO. : 4,130,535
DATED : December 19, 1978
INVENTOR(S) : Aubert Y. Coran et al It is certified that error appears in the above-identified patent and that said Letters Patent are hereby corrected as shown below:

Table VIII, Stock 52, the amount of TMTD, should read "0.375" instead of [01.75].

Claim 29, column 16, line 64, [1] should read "24".

Claim 40, column 18, line 7, [con-] should read "non-".

Signed and Sealed this

Nineteenth Day of June 1979

[SEAL]

Attest:

RUTH C. MASON
Attesting Officer

DONALD W. BANNER
Commissioner of Patents and Trademarks